D. McCURDY.
Farm Gate.

No. 57,537.

Patented Aug. 28, 1866.

Witnesses
Wm E Lyon
Theo Lusch

Inventor
D. McCurdy
per Munn & Co atty

UNITED STATES PATENT OFFICE.

DAVID McCURDY, OF OTTAWA, OHIO.

IMPROVEMENT IN FARM-GATES.

Specification forming part of Letters Patent No. 57,537, dated August 28, 1866.

*To all whom it may concern:*

Be it known that I, DAVID McCURDY, of Ottawa, in the county of Putnam and State of Ohio, have invented a new and Improved Farm-Gate; and I do hereby declare that the following is a full, clear, and exact description thereof, which will enable those skilled in the art to make and use the same, reference being had to the accompanying drawings, forming part of this specification.

The principal objects of the present invention are to so hang a farm-gate as to enable it to be only partially opened for the passage of horses, cattle, &c., and entirely opened for the passage of teams; and they are satisfactorily secured thereby, as will be apparent from the following detail description, reference being had to the accompanying plate of drawings, of which—

Figure 1:
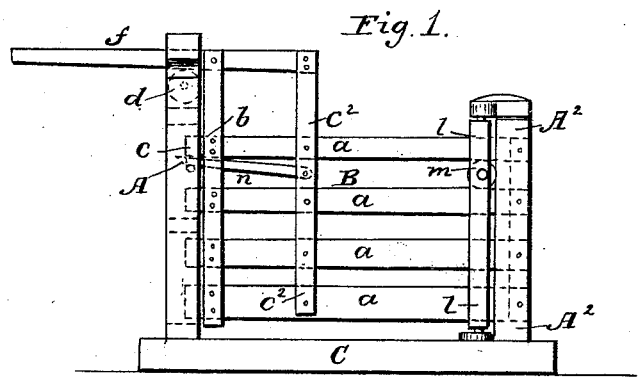
Figure 2:
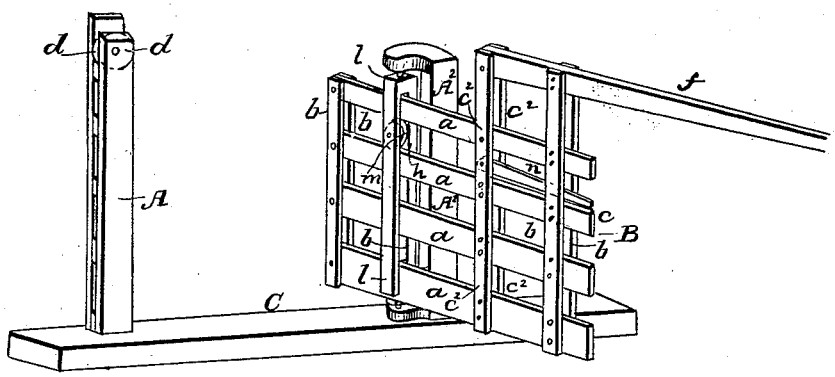

Figure 1 is a front elevation of the gate constructed and hung according to my improvement, and closed; Fig. 2, a similar view of the gate partially swung open.

A $A^2$ in the drawings represent the two side posts of the fence, in and between which the gate B is hung, as will be presently explained. These posts may be either driven into the ground or attached to a sill-strip, C, or set up in any of the ordinary modes, as may be deemed best or desirable, according to the position in which the gate is to be placed.

The gate consists of a series of horizontal parallel bars, *a a a*, placed at any suitable distances apart, and extending from the sill of the gate to any desired height, which bars are secured together at each end by upright strips *b b*, upon both sides of the same and opposite to each other, and also between each end, a short distance from the end *c* of the gate, by strips $c^2$ $c^2$, similarly attached thereto.

The strips *c c* extend some distance above the uppermost bar of the gate, from which and in the same direction with the gate, passing over a pulley or wheel, *d*, in the top of the side post, A, horizontally extends a long bar, *f*, the upright strips at the end *c* of the gate, over which it passes, being also extended upward and fastened to the said bar *f*.

The horizontal bars of the gate also pass loosely through the vertical slot *h* in the swiveled post *l* of the side post, $A^2$, the upper bar of the gate resting upon a pulley or wheel, *m*, of the same. This swiveled post is so hung with regard to the fixed side post, $A^2$, that when the gate is closed or extended across between its side posts, A $A^2$, the connecting-strips of the bars at the post $A^2$ will come behind it, as plainly shown in the drawings.

When desired to only partially open the gate—as, for instance, to allow horses, cattle, or a person on horseback, &c., to pass through it—the gate is slid laterally from the post A toward the post $A^2$, it moving by its horizontal bar *f* upon the pulley of the post A and upon the pulley of the swivel-post of the other side post, $A^2$, the bar *f* being made of such a length as to allow it thus to be sufficiently opened without sagging; but, if desired, when a team is to pass through, to fully open the gate, it is first slid laterally until it is balanced, or nearly so, upon the wheel of the swiveled post; when, raising the gate sufficiently to lift its bar *f* from the side post, A, the gate is then swung around, turning by its swiveled post upon the post $A^2$ to the requisite distance, the gate being closed in either case by simply sliding it back to its original position in the first instance, and, in the second, by first swinging it into a line with the side posts, and then sliding it upon its wheels toward the post A, as is obvious without further explanation.

In connection with the gate above described I use a latch-lever, *n*, placed horizontal and hung upon a fulcrum at or near the end *c* of the gate, which lever projects beyond such end *c* of the gate, and when the gate is closed slides over the fixed cross-pin *o* of the side post, A, between which and the horizontal bar of the gate next above it is wedged, as it were, thus firmly fastening the gate, as is obvious by an inspection of Fig. 1.

I claim as new and desire to secure by Letters Patent—

As an improvement in gates, the arrangement of the post A, roller *d*, and pin *o*, in combination with the extension-bar *f*, latch *n*, slotted swiveled post *l*, roller *m*, bars *a*, and post $A^2$, constructed and operating in the manner herein specified and described.

DAVID McCURDY.

Witnesses:
C. J. SWAN,
C. BARR.